(12) United States Patent
Canterbury et al.

(10) Patent No.: US 7,552,627 B2
(45) Date of Patent: Jun. 30, 2009

(54) BRAKE WEAR MEASUREMENT APPARATUS AND METHOD

(75) Inventors: Tracey A. Canterbury, Union, OH (US); Joe B. Norsworthy, Crestwood, KY (US)

(73) Assignee: Goodrich Corporation, Charlotte, NC (US)

( * ) Notice: Subject to any disclaimer, the term of this patent is extended or adjusted under 35 U.S.C. 154(b) by 266 days.

(21) Appl. No.: 11/796,758

(22) Filed: Apr. 30, 2007

(65) Prior Publication Data

US 2007/0251308 A1     Nov. 1, 2007

Related U.S. Application Data

(60) Provisional application No. 60/796,950, filed on May 1, 2006.

(51) Int. Cl.
    *G01M 17/00* (2006.01)
(52) U.S. Cl. .................................. 73/121; 188/1.11 W
(58) Field of Classification Search ................... 73/121, 73/128, 129; 188/1.11 R, 1.11 W, 1.11 L, 188/1.11 E
See application file for complete search history.

(56) References Cited

U.S. PATENT DOCUMENTS

| | | | | |
|---|---|---|---|---|
| 4,658,936 A | * | 4/1987 | Moseley | 188/1.11 R |
| 5,035,303 A | * | 7/1991 | Sullivan | 188/1.11 W |
| 5,697,472 A | * | 12/1997 | Walker et al. | 188/1.11 W |
| 6,076,639 A | * | 6/2000 | Dahlen et al. | 188/1.11 R |
| 6,237,723 B1 | * | 5/2001 | Salsman | 188/1.11 W |
| 6,460,659 B1 | * | 10/2002 | Schaffer et al. | 188/1.11 W |
| 6,637,262 B2 | * | 10/2003 | Chang et al. | 188/11 |
| 2003/0084714 A1 | * | 5/2003 | Chang et al. | 73/121 |

* cited by examiner

*Primary Examiner*—Eric S McCall
(74) *Attorney, Agent, or Firm*—Snell & Wilmer L.L.P.

(57) ABSTRACT

A brake wear measurement apparatus for use on a brake assembly equipped with a wear pin having a diameter and an exposed height, which comprises a plunger sleeve having a first end and a second end, and an inner diameter larger than the wear pin outer diameter; a plunger slidably mounted in the plunger sleeve having a corresponding first end and second end and wherein the plunger first end is exposed, such that when the brake wear measurement apparatus is placed over the wear pin, the wear pin contacts the plunger first end, and moves the plunger within the plunger sleeve a retraction distance delta, which corresponds to the wear pin exposed height; a plunger stop mechanism, which prevents the plunger from sliding out of the plunger sleeve when no external force is applied to the plunger; and, a locking mechanism, wherein the locking mechanism acts to prevent the plunger from sliding within the plunger sleeve when the locking mechanism is engaged. The apparatus may further comprise a brake wear correlation program whereby the input of a brake part number, a plunger retraction distance delta, and a number of performed landings will result in an output of an estimated number of remaining landings.

13 Claims, 7 Drawing Sheets

BRAKE WEAR MEASUREMENT APPARATUS AND METHOD

This application claims the benefit of U.S. Provisional Application No. 60/796,950, filed May 1, 2006.

BACKGROUND

The present invention is in the field of aircraft braking systems. More specifically this invention relates to an apparatus and method for more easily measuring the wear of aircraft brakes.

Presently aircraft brakes typically are manufactured with a wear pin. This pin is an indication of the wear of the brakes. On larger aircraft, when the wear pin is no longer protruding from its indicator hole, the brakes are ready for replacement. However, on smaller aircraft, where the wear on each landing is less, even a small amount of wear pin remaining can be a significant amount of remaining landings. However, because these brakes are not checked after every landing, and an approximate number of remaining landings was not known, often a decision is made to remove these brakes from the aircraft when there is a small amount of wear pin still showing. Often the practice has been to remove the brakes from the aircraft to get an accurate measurement of the remaining wear pin, to better determine the remaining number of landings. Once an accurate measurement of the wear pin is obtained, the original size of the wear pin is determined by looking up the part number. The difference between the original size and the current size is then divided by the number of landings to give an approximate "wear-per-landing", and this is then used to estimate the number of remaining landings. Because of the time and complexity of this process, it is usually not performed on site, and sometimes the brake is just scrapped with remaining landings left.

An apparatus and method is desired which allows measurement of the wear pin without removal of the brake from the aircraft. It is further desired to have a program which would allow for easy calculation of the remaining landings based on the measurement of the wear pin.

SUMMARY

A brake wear measurement apparatus for use on a brake assembly equipped with a wear pin having a diameter and an exposed height, which comprises a plunger sleeve having a first end and a second end, and an inner diameter larger than the wear pin outer diameter; a plunger slidably mounted in the plunger sleeve having a corresponding first end and second end and wherein the plunger first end is exposed, such that when the brake wear measurement apparatus is placed over the wear pin, the wear pin contacts the plunger first end, and moves the plunger within said plunger sleeve a retraction distance delta, which corresponds to the wear pin exposed height; a plunger stop mechanism, which prevents the plunger from sliding out of the plunger sleeve when no external force is applied to the plunger; and, a locking mechanism, wherein the locking mechanism acts to prevent the plunger from sliding within the plunger sleeve when said locking mechanism is engaged. The apparatus may further comprise a brake wear correlation program whereby the input of a brake part number, a plunger retraction distance delta, and a number of performed landings will result in an output of an estimated number of remaining landings.

DETAILED DESCRIPTION

Figure 1:
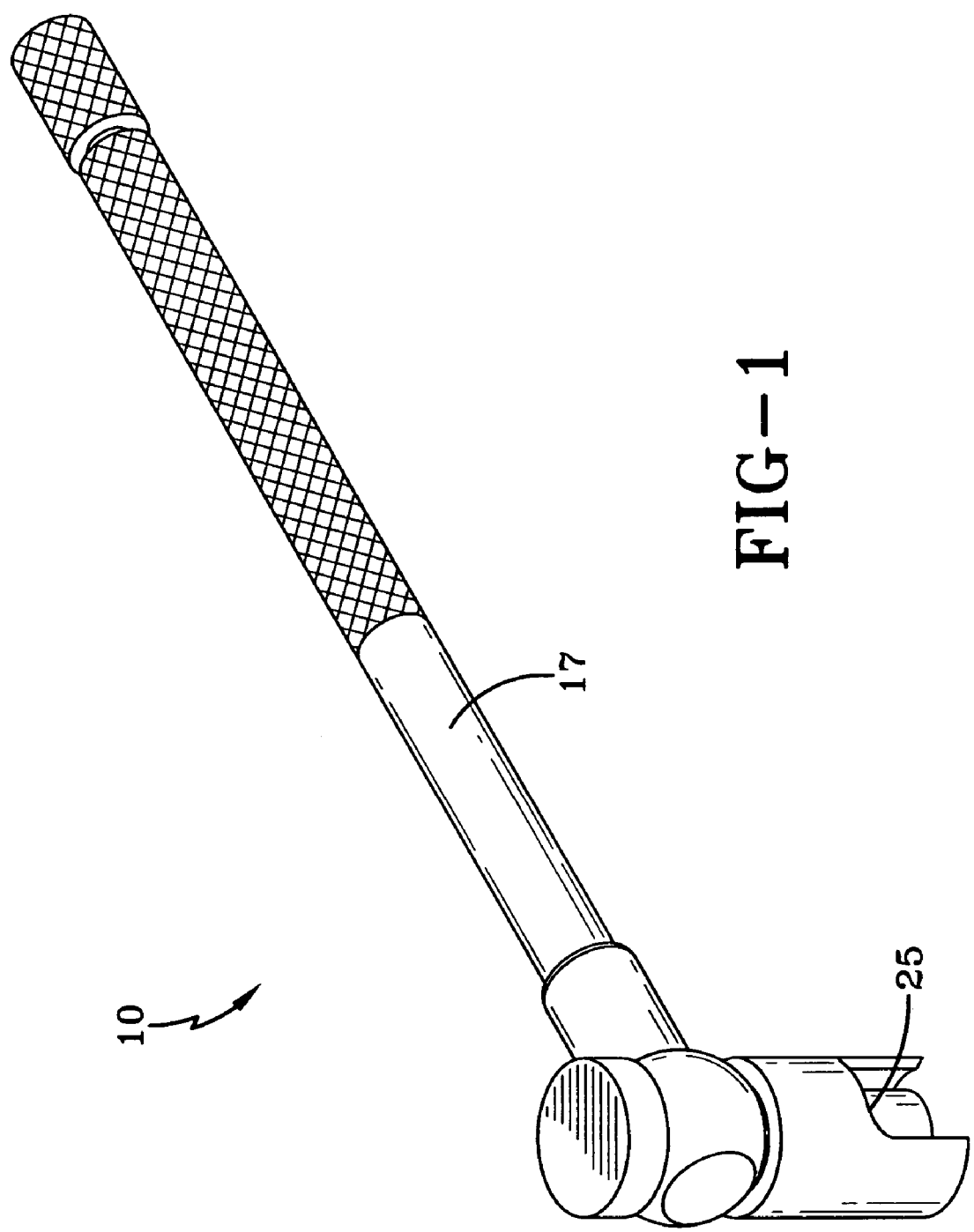
FIG. 1 is an isometric view of a brake wear measurement apparatus according to an aspect of the invention.
Figure 2:
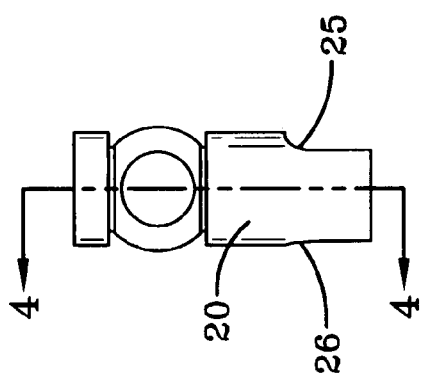
FIG. 2 is an end view of a brake wear measurement apparatus according to an aspect of the invention.
Figure 3:
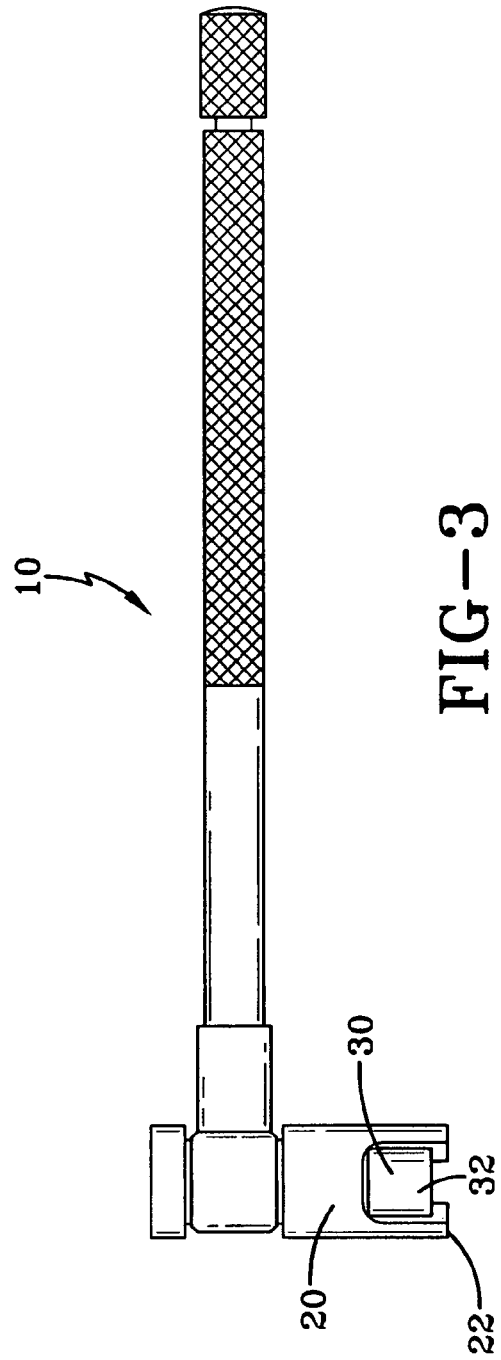
FIG. 3 is a side view of a brake wear measurement apparatus according to an aspect of the invention.
Figure 4:
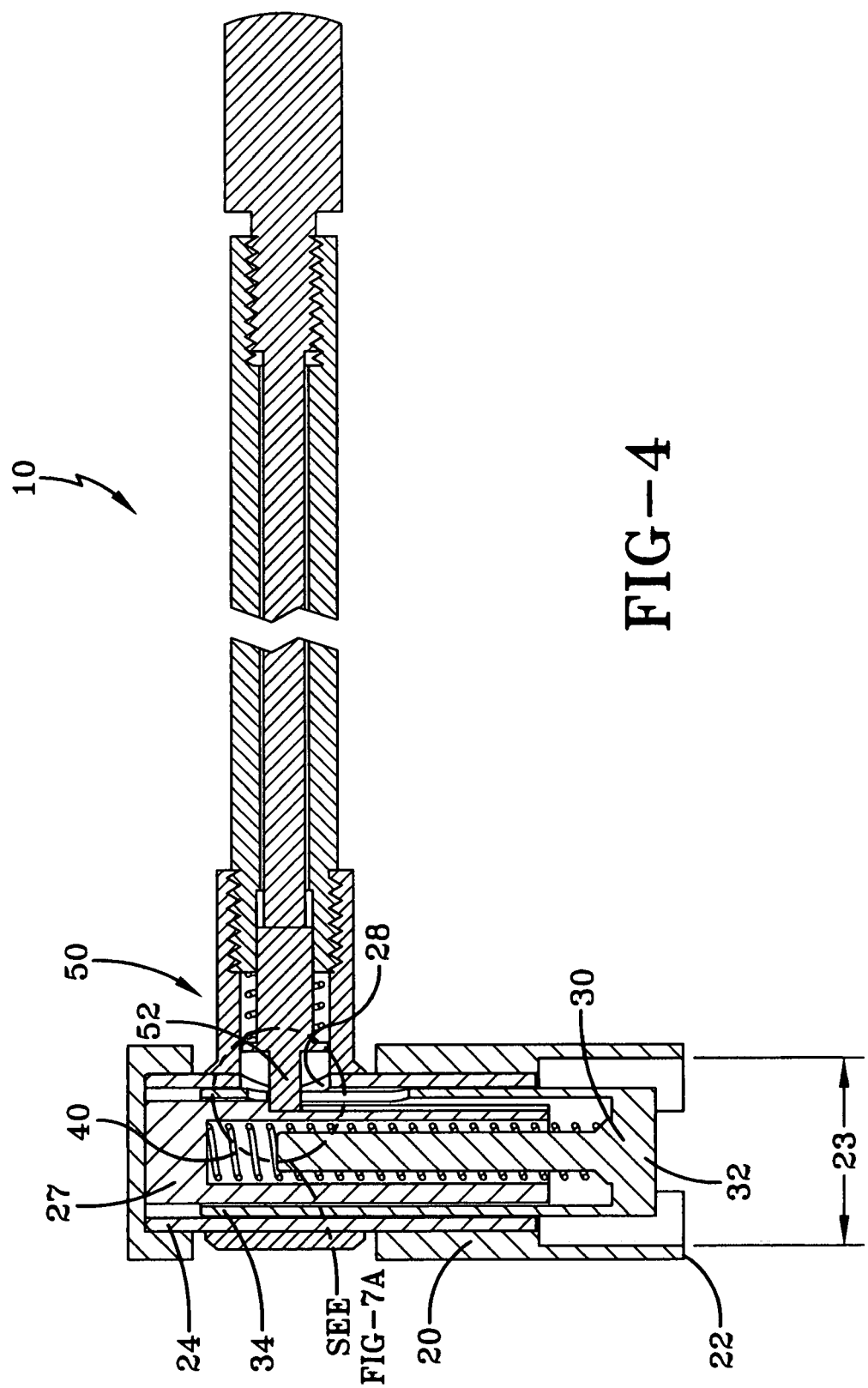
FIG. 4 is a cross sectional view, from FIG. 2, of a brake wear measurement apparatus according to an aspect of the invention.
Figure 5:
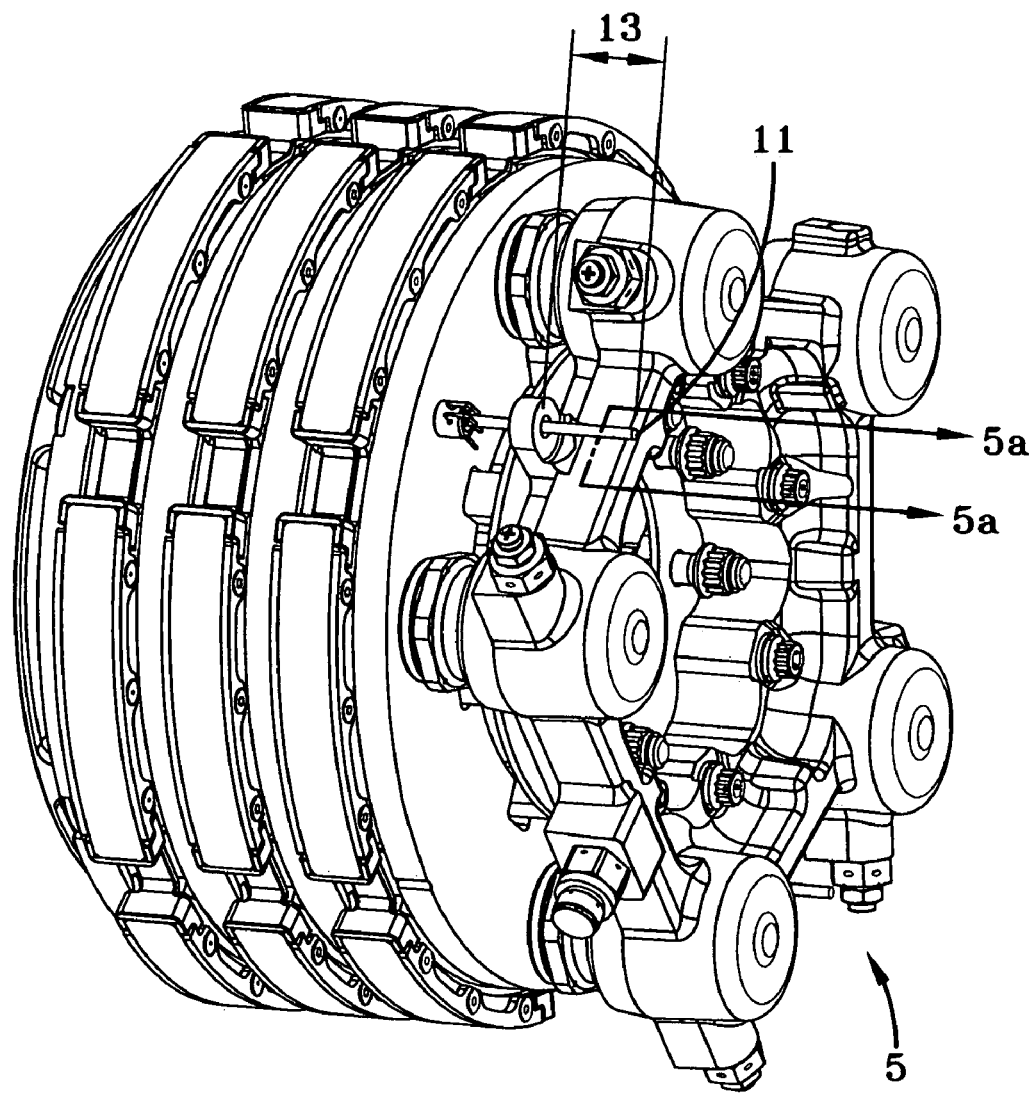
FIG. 5 is a cut-away view of a brake assembly, showing wear pin.
Figure 5A:
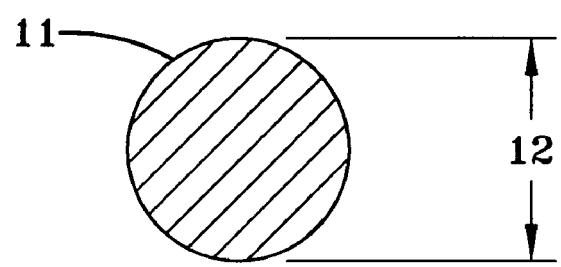
FIG. 5A is a cross sectional view of a wear pin from FIG. 5.
Figures 6, 7:
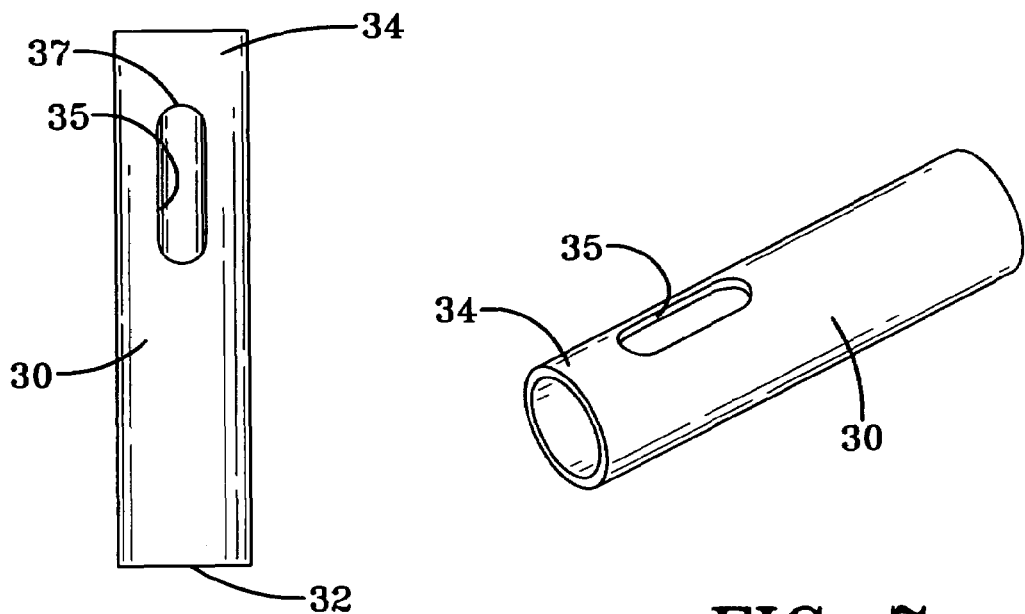
FIG. 6 is a side view of a plunger according to an aspect of the invention.
FIG. 7 is an isometric view of a plunger according to an aspect of the invention.
Figure 7A:
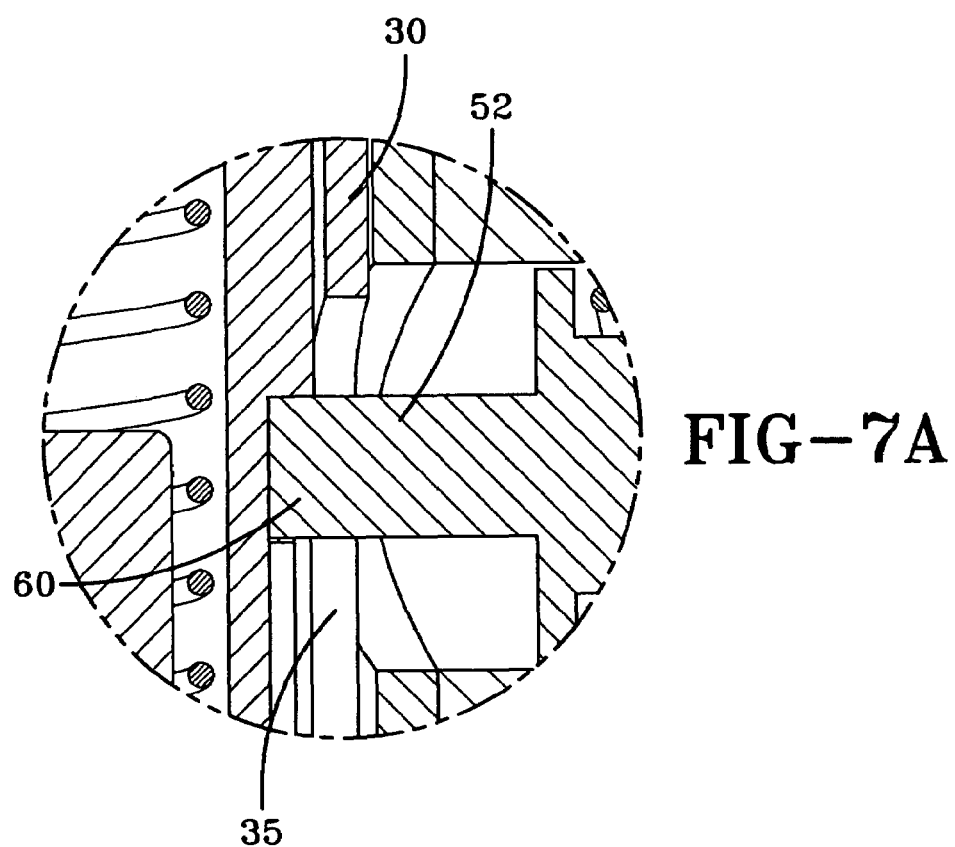
FIG. 7A is a cut out from FIG. 4 showing a close-up of the plunger stop according to an aspect of the invention.
Figure 8:
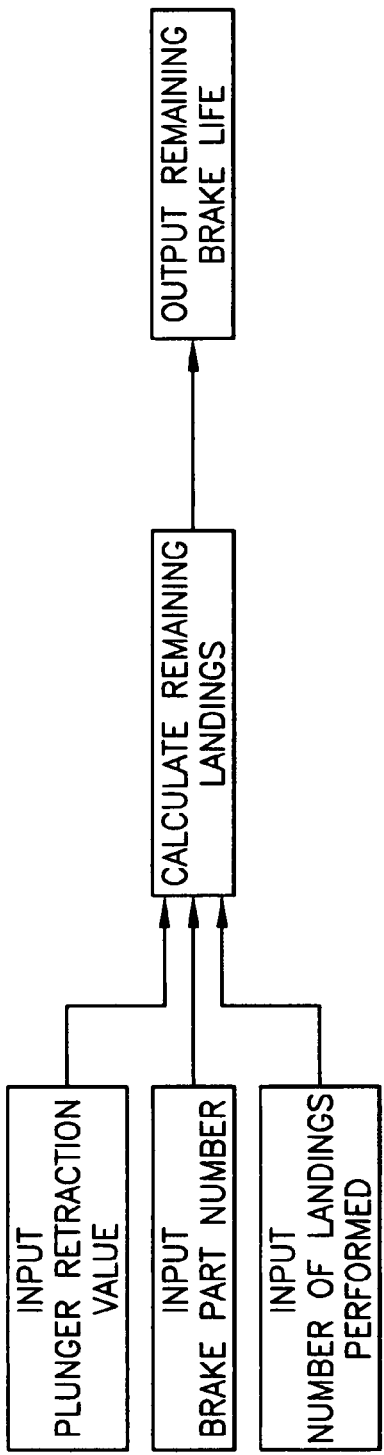
FIG. 8 is a flow chart of a brake wear correlation program according to an aspect of the invention.
Figure 9:
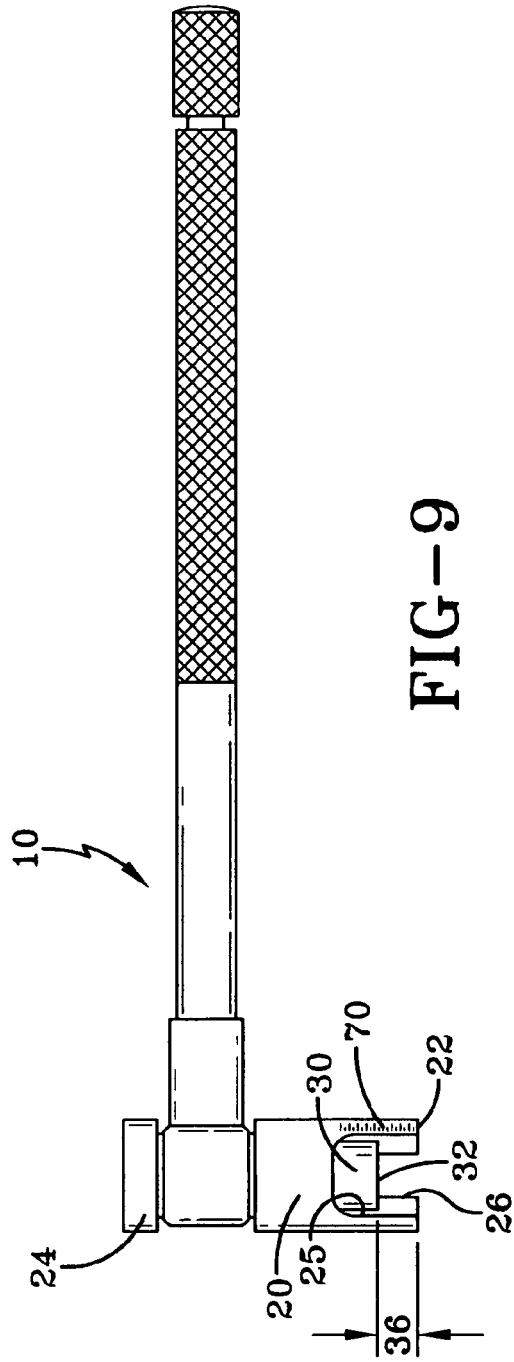
FIG. 9 is a side view of a brake wear measurement apparatus with the plunger locked in a retracted position according to an aspect of the invention.

Various aspects of the invention are presented in FIGS. 1-10 which are not drawn to scale and in which like components are numbered alike. Referring now to these figures, according to an aspect of the invention, a brake wear measurement apparatus 10 for use on a brake assembly 5 equipped with a wear pin 11 having a diameter 12, and an exposed height 13, is shown. This apparatus comprises a plunger sleeve 20, a plunger 30, a plunger stop 60, a plunger spring 40, and a locking mechanism 50.

The plunger sleeve 20 has a first end 22 and a second end 24, wherein the second end 24 has a spring stop, which in a preferred embodiment is a spring sleeve 27. The plunger sleeve first end 22 has an inner diameter 23, wherein the plunger sleeve first end inner diameter 23 is greater than the wear pin diameter 12.

The plunger 30 has a first end 32 and a second end 34, wherein the plunger 30 is slidably mounted in the plunger sleeve 20. When the plunger is mounted in the plunger sleeve 20, the plunger first end 32 is exposed, such that when the brake wear measurement apparatus 10 is placed over the wear pin 11, the wear pin 11 contacts the plunger first end 32, and moves the plunger 30 within the plunger sleeve 20. The plunger 30 thus retracts a distance delta 36 within the plunger sleeve 20. This retraction distance delta 36 corresponds to the wear pin exposed height 13.

The plunger stop 60 prevents the plunger 30 from exiting the plunger sleeve 20.

The plunger spring 40 is mounted in the plunger sleeve against the spring stop. When the spring stop is a spring sleeve 27, the spring 40 is mounted in the spring sleeve 27. The plunger spring 40 acts on the plunger 30, such that when there are no other external forces on the plunger 30, the plunger spring 40 forces the plunger 30 against the plunger stop 60 such that the plunger first end 32 is flush with the plunger sleeve first end 22.

The locking mechanism 50 acts such that if a force is applied to the plunger first end 32, thus compressing the plunger spring 40, and forcing the plunger 30 to retract within the plunger sleeve 20, the locking mechanism 50 may be engaged to lock the plunger 30 in such retracted position.

According to an aspect of the invention, the plunger sleeve first end 22 has at least one cut out area 25, such that a portion of the plunger first end 32 is exposed, even when the plunger 30 is retracted. According to a further aspect of the invention, the plunger sleeve first end 22 has a second cut out 26 for visible confirmation of proper tool use, and to prevent interference with the piston housing during use. In a further aspect of the invention, there are measurement gradients 70 on the outside of the plunger sleeve first end 22, around the cut-out area 25 such that the retraction distance 36 of the plunger 30 can be determined without the use of another measuring tool.

According to a further aspect of the invention, the brake wear measurement apparatus 10 further comprises a handle 17 extending from the plunger sleeve 20.

In a further embodiment of the invention, the locking mechanism 50 comprises a hole 28 in the plunger sleeve second end 24, wherein the hole 28 exposes a portion of the plunger second end 34, and a locking pin 52 sized to fit into the hole 28, such that the locking pin 52 may be extended into the hole 28 against the plunger second end 34 with a force which will prevent the plunger 30 from moving. In a preferred embodiment of the invention, the locking pin 52 is located within the handle 17.

In a preferred embodiment of the invention, the plunger 30 has a slot 35 which lines up with the plunger sleeve hole 28 such that the locking pin 52 fits into the plunger slot 35. This combination can be used as the plunger stop 60 where the slot 35 has a top end 37 such that when the locking pin 52 is at the slot top end 37, the plunger first end 32 is flush with the plunger sleeve first end 22.

When the brake wear measurement apparatus is in use, the wear pin 11 will force the plunger 30 to retract away from the plunger sleeve first end 22. The distance that the plunger first end 32 retracts away from the plunger sleeve first end 22 is the plunger retraction distance 36.

According to a further aspect of the invention, the brake wear measurement apparatus 10 further comprises a brake wear correlation program whereby the input of a brake part number, a plunger retraction distance 36, and a number of performed landings will result in an output of an estimated number of remaining landings. This program contains data for the wear pin size for the different part numbers, and will perform all the calculations.

According to an aspect of the invention, a method for determining remaining brake life for a brake assembly 5 equipped with a wear pin 11 comprises the steps of placing the brake measurement tool 10 over the wear pin 11, such that the wear pin 11 slides into the plunger sleeve 20, forcing the plunger 30 to retract; locking the plunger 30 in the retracted position with the locking mechanism 50; removing the brake measurement tool 10 from the wear pin 11; measuring the plunger retraction distance 36 by measuring the distance between the plunger first end 32 in the retracted position, and the plunger sleeve first end 22; and, inputting the plunger retraction distance 36 into a brake wear correlation program whereby the input of a brake part number, a plunger retraction distance 36, and a number of performed landings will result in an output of an estimated number of remaining landings.

Figure 10:
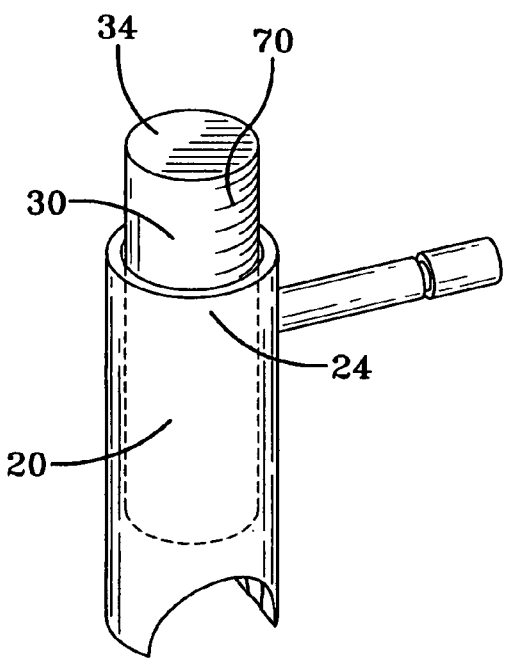
FIG. 10 is an isometric view of a brake wear measurement apparatus according to an aspect of the invention.
Figure 11:
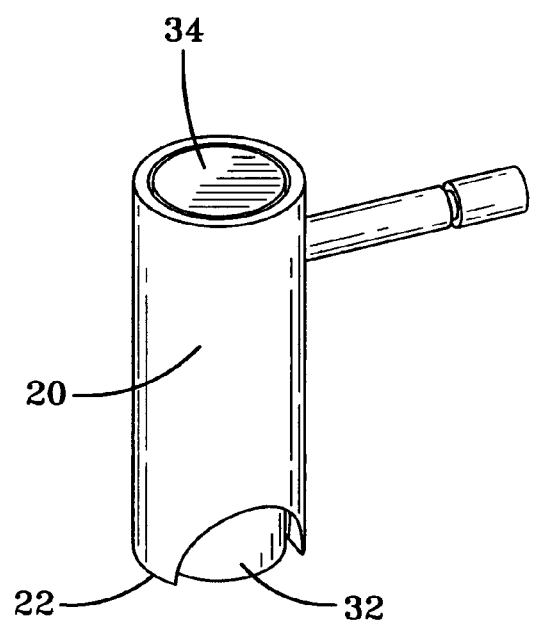
FIG. 11 is an isometric view of a brake wear measurement apparatus according to an aspect of the invention.
Figure 12:
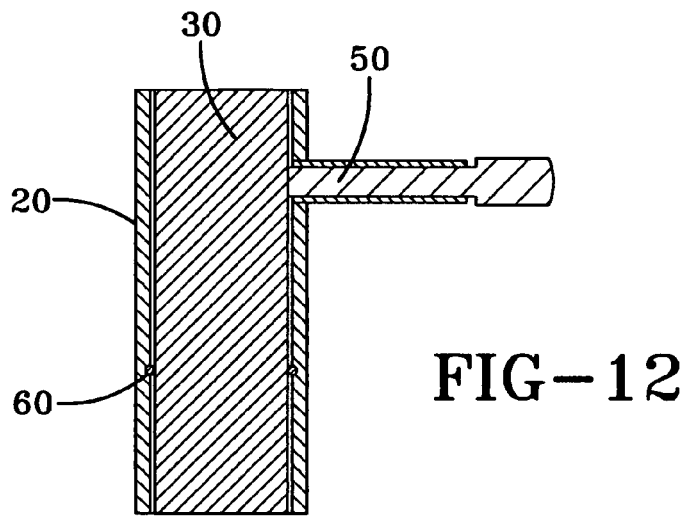
FIG. 12 is a cross-sectional view of a brake wear measurement apparatus according to an aspect of the invention.

A very simplified brake wear measurement device according to an aspect of the invention is shown in FIGS. 10-12. According to this aspect, the plunger sleeve 20 has a first end 22 and a second end 24 and further has an inner diameter 23, wherein the inner diameter 23 is larger than the wear pin diameter 12. A plunger 30 is slidably mounted in the plunger sleeve 20, and has a corresponding plunger first end 32 and plunger second end 34. A plunger stop mechanism 60, prevents the plunger 32 from sliding out of the plunger sleeve 20 when no external force is applied to the plunger 30. A locking mechanism 50, acts to prevent the plunger 30 from sliding within the plunger sleeve 20 when the locking mechanism 50 is engaged. The plunger sleeve first end 22 has a cut out 25, such that the plunger first end 32 is visible. The cut out 25 may have gradient markings to measure the movement of the plunger 30.

According to an aspect of the invention, the plunger sleeve second end 24 may be open to allow the plunger second end 34 to extend. The plunger second end 34 may have gradient markings 70 to measure the movement of the plunger 30. In each case, the gradient markings should correlate to the delta between the plunger first end 32 and the plunger sleeve first end 22, and thus to wear pin exposed height 13.

According to a further aspect of the invention, the plunger stop mechanism 60 is a friction fitted o-ring. This could act as both the plunger stop mechanism 60 and the locking mechanism 50.

We claim:

1. A brake wear measurement apparatus for use on a brake assembly equipped with a wear pin having a diameter, and an exposed height, comprising:
   a plunger sleeve having a first end and a second end, wherein said second end has a spring stop, and wherein said plunger sleeve first end has an inner diameter, wherein said plunger sleeve first end inner diameter is greater than the wear pin diameter;
   a plunger having a first end and a second end, wherein said plunger is slidably mounted in said plunger sleeve, and wherein said plunger first end is exposed, such that when said brake wear measurement apparatus is placed over the wear pin, the wear pin contacts said plunger first end, and moves said plunger within said plunger sleeve;
   a plunger stop, wherein said plunger stop prevents said plunger from exiting said plunger sleeve;
   a plunger spring mounted in said plunger sleeve, against said spring stop, wherein said plunger spring acts on said plunger, such that when there are no other external forces on said plunger, said plunger spring forces the plunger against said plunger stop, such that said plunger first end is flush with said plunger sleeve first end; and,
   a locking mechanism, such that if a force is applied to said plunger first end, thus compressing said plunger spring, and forcing said plunger to retract within said plunger sleeve, said locking mechanism will lock said plunger in such retracted position.

2. The brake wear measurement apparatus of claim 1 wherein said plunger sleeve first end has at least one cut out area, such that a portion of said plunger first end is exposed, even when said plunger is retracted.

3. The brake wear measurement apparatus of claim 1 further comprising a handle extending from said plunger sleeve.

4. The brake wear measurement apparatus of claim 1 further comprising a brake wear correlation program whereby the input of a brake part number, a plunger retraction distance delta, and a number of performed landings will result in an output of an estimated number of remaining landings.

5. The brake wear measurement apparatus of claim 1 wherein said spring stop is a spring sleeve.

6. The brake wear measurement apparatus of claim 1 wherein said locking mechanism comprises a hole in said plunger sleeve second end, wherein said hole exposes a portion of said plunger second end, and a locking pin sized to fit into said hole, such that said locking pin may be extended into said hole against said plunger second end with a force which will prevent the plunger from moving.

7. The brake wear measurement apparatus of claim 6 further comprising a handle extending from said plunger sleeve, wherein said locking pin is located within said handle.

8. A method for determining remaining brake life for a brake assembly equipped with a wear pin having a diameter and an exposed height, comprising the steps:
placing a brake measurement tool over the wear pin, wherein the brake measurement tool comprises a plunger sleeve having a first end and a second end and further having an inner diameter, wherein said inner diameter is larger than the wear pin outer diameter; a plunger slidably mounted in said plunger sleeve having a corresponding first end and second end; a plunger stop mechanism, which prevents said plunger from sliding out of said plunger sleeve when no external force is applied to said plunger; and a locking mechanism, wherein said locking mechanism acts to prevent said plunger from sliding within said plunger sleeve when said locking mechanism is engaged; wherein at least one end of said plunger is exposed, wherein placement of said brake measurement tool over said wear pin forces said plunger to retract a distance delta, to a retracted position, wherein the retraction distance delta corresponds to the wear pin exposed height;
locking said plunger in said retracted position with said locking mechanism;
removing said brake measurement tool from said wear pin;
measuring the plunger retraction distance delta;
inputting the plunger retraction distance delta into a brake wear correlation program whereby the input of a brake part number, a plunger retraction distance delta, and a number of performed landings will result in an output of an estimated number of remaining landings.

9. A brake wear measurement apparatus for use on a brake assembly equipped with a wear pin having a diameter and an exposed height, comprising:
a plunger sleeve having a first end and a second end and further having an inner diameter, wherein said inner diameter is larger than the wear pin outer diameter;
a plunger slidably mounted in said plunger sleeve having a corresponding first end and second end and wherein said plunger first end is exposed, such that when said brake wear measurement apparatus is placed over the wear pin, the wear pin contacts said plunger first end, and moves said plunger within said plunger sleeve a retraction distance delta, wherein said retraction distance delta corresponds to the wear pin exposed height;
a plunger stop mechanism, which prevents said plunger from sliding out of said plunger sleeve when no external force is applied to said plunger; and,
a locking mechanism, wherein said locking mechanism acts to prevent said plunger from sliding within said plunger sleeve when said locking mechanism is engaged.

10. The brake wear measurement apparatus of claim 9 further comprising
a cut out in said plunger sleeve first end, such that said plunger first end is visible, even when said plunger is retracted during use.

11. The brake wear measurement apparatus of claim 9 wherein said plunger stop mechanism is a friction fitted o-ring.

12. The brake wear measurement apparatus of claim 9 wherein said plunger stop mechanism is a friction fitted o-ring, and wherein this same friction fitted o-ring is also the locking mechanism.

13. The brake wear measurement apparatus of claim 9 wherein said plunger sleeve second end is open, to allow said plunger second end to extend outside of said plunger sleeve, and further wherein said plunger second end has gradient markings, such that when said second end is exposed, the gradient markings, correlate to a delta between said plunger first end 32 and said plunger sleeve first end 22, and thus to wear pin exposed height.

* * * * *